United States Patent
Hsing et al.

(10) Patent No.: US 10,868,457 B2
(45) Date of Patent: Dec. 15, 2020

(54) MOTOR AND HEAT-DISSIPATION DEVICE THEREOF

(71) Applicant: DELTA ELECTRONICS, INC., Taoyuan (TW)

(72) Inventors: Lei-Chung Hsing, Taoyuan (TW); Hsien-Jen Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 190 days.

(21) Appl. No.: 16/160,094

(22) Filed: Oct. 15, 2018

(65) Prior Publication Data

US 2019/0229585 A1 Jul. 25, 2019

(30) Foreign Application Priority Data

Jan. 23, 2018 (CN) .......................... 2018 1 0065346

(51) Int. Cl.
*H02K 9/22* (2006.01)
*H02K 9/06* (2006.01)
*H02K 9/02* (2006.01)

(52) U.S. Cl.
CPC .................. *H02K 9/22* (2013.01); *H02K 9/02* (2013.01); *H02K 9/06* (2013.01)

(58) Field of Classification Search
CPC .. H02K 9/02; H02K 9/04; H02K 9/06; H02K 9/22; H02K 9/14; H02K 9/10; H02K 5/20; H02K 5/18
USPC .......................................................... 310/62
See application file for complete search history.

(56) References Cited

U.S. PATENT DOCUMENTS

| | | | | |
|---|---|---|---|---|
| 7,167,364 | B2 * | 1/2007 | Lopatinsky | H01L 23/467 165/122 |
| 8,120,227 | B2 * | 2/2012 | Leroy | H02K 9/06 310/214 |
| 9,124,145 | B2 * | 9/2015 | Lau | H02K 9/06 |
| 9,520,755 | B2 * | 12/2016 | Lang | H02K 5/18 |

(Continued)

FOREIGN PATENT DOCUMENTS

CN 102637542 A 8/2012
CN 103715787 A 4/2014

(Continued)

*Primary Examiner* — Forrest M Phillips
(74) *Attorney, Agent, or Firm* — Kirton McConkie; Evan R. Witt

(57) ABSTRACT

A motor comprises a stator, heatsinks, a rotor and a heat-dissipation device. The stator has a hollow portion, a coil portion and a housing portion having a first surface, a second surface and sidewalls. The hollow portion is penetrated through the housing portion. The coil portion is disposed between the hollow portion and the housing portion. The heatsinks are respectively disposed on different sidewalls. The heat-dissipation device comprises a wind-guiding cover and a first fan. The wind-guiding cover comprises a wind-guiding main board and wind-guiding lateral boards. The wind-guiding main board is disposed adjacent to the second surface. The wind-guiding lateral boards are vertically extended from different lateral edges of the wind-guiding main board towards the same direction. Each wind-guiding lateral board is disposed corresponding to one of the heatsinks, and at least one of the wind-guiding lateral boards has a hole. The first fan is received by the hole.

15 Claims, 10 Drawing Sheets

(56) References Cited

U.S. PATENT DOCUMENTS

| | | | | |
|---|---|---|---|---|
| 10,483,812 B2 * | 11/2019 | Saari | ......................... | H02K 1/20 |
| 2013/0076172 A1 * | 3/2013 | Koyama | .................. | H02K 9/14 |
| | | | | 310/63 |
| 2019/0393758 A1 * | 12/2019 | Chou | ....................... | H02K 9/04 |

FOREIGN PATENT DOCUMENTS

| | | |
|---|---|---|
| CN | 205335988 U | 6/2016 |
| CN | 206379836 U | 8/2017 |
| JP | H02110963 U | 9/1990 |
| JP | H06281256 A | 10/1994 |
| JP | 2010-206991 A | 9/2010 |
| JP | 2013062898 A | 4/2013 |
| JP | 2014072960 A | 4/2014 |
| TW | 371128 U | 9/1999 |
| TW | 486196 U | 5/2002 |

* cited by examiner

MOTOR AND HEAT-DISSIPATION DEVICE THEREOF

CROSS-REFERENCE TO RELATED APPLICATION

This application claims priority from China Patent Application No. 201810065346.8, filed on Jan. 23, 2018, the entire contents of which are incorporated herein by reference for all purposes.

FIELD OF THE INVENTION

The present invention relates to a motor, and more particularly to a motor and a heat-dissipation device thereof with a silicon steel sheet being stamped to form an integrated structure of a motor housing and a stator to greatly enhance the heat-dissipation efficiency.

BACKGROUND OF THE INVENTION

Motors utilized in fields of industry are commonly applied as driving sources. With the development of technology, the importance of the heat-dissipation of a motor is increased. Especially, the requirements of many apparatus are to eliminate the occupied space, so that the enhancement of the heat-dissipation becomes a critical point of the motor industry.

In general, the thermal conductive path of a motor can be known by referring to FIG. 1. FIG. 1 schematically illustrates a sectional view of a conventional motor. As shown in FIG. 1, the thermal conductive path of a conventional motor is, from inside to outside, conducted from a coil 11 to a stator 12, conducted from the stator 12 to a motor housing 13, and then escaped from the system through the airflow driven by a fan. Since the contact interfaces are existed between the components of the motor, the contact heat resistances are certainly existed. The efficiency of the heat transfer from the components to the motor housing is lowered by the contact heat resistances, so that the temperature of the inside coil cannot be effectively reduced, thereby affecting the total efficiency of the motor.

In some application scenarios, referring to FIG. 1 and FIG. 2, among which FIG. 2 schematically illustrates another sectional view of a conventional motor, the heat-dissipation design of the conventional motor 1 is usually provided with a fan shroud 21 and a fan 22 at the rear of the conventional motor 1 to blow or suck the air of the motor housing 13 to separate the heat from the system. This method not only has poor cooling effect but also causes the overall volume of the motor to increase without accompanying the improvement of the heat-dissipation efficiency because a large amount of the rear space of the conventional motor 1 is occupied by the fan shroud 21 and the fan 22.

Therefore, there is a need of providing an improved motor and an improved heat-dissipation device thereof that can reduce the contact heat resistance, enhance the fan efficiency and reduce the installation space of the fan, which are distinct from the prior art in order to solve the above drawbacks.

SUMMARY OF THE INVENTION

Some embodiments of the present invention are to provide a motor and a heat-dissipation device thereof in order to overcome at least one of the above-mentioned drawbacks encountered by the prior arts.

The present invention provides a motor and a heat-dissipation device thereof. Through the design of a motor without any extra housing, the heat generated by the coil can be directly conducted to the stator and be removed from the hollowed-out areas. Not only the contact heat resistance that is usually existed in the conventional motor is not existed but also the heat transfer efficiency is enhanced and the material cost is reduced.

The present invention also provides a motor and a heat-dissipation device thereof. By applying the heat-dissipation device, the main fan disposed on the wind-guiding main board can directly implement the heat-dissipation on the hollowed-out areas, and the lateral fans disposed on the wind-guiding lateral boards can directly implement the heat-dissipation on the sidewalls of the stator. Moreover, since the airflow paths of the main fan and the lateral fans are independent and isolated to each other, the energy loss caused by the interaction of the airflow paths can be avoided, so that the utilization of fans are increased, and the total heat-dissipating area of the motor is also increased.

In accordance with an aspect of the present invention, there is provided a motor. The motor comprises a stator, a plurality of heatsinks, a rotor and a heat-dissipation device. The stator has a hollow portion, a coil portion and a housing portion. The housing portion has a first surface, a second surface and a plurality of sidewalls. The first surface and the second surface are the front surface and the rear surface of the stator. The hollow portion is penetrated through the housing portion and disposed at the center of the housing portion. The coil portion is disposed around the hollow portion and between the hollow portion and the housing portion, and directly contacted with the housing portion. The heatsinks are respectively disposed on different sidewalls of the sidewalls of the housing portion. The rotor comprises a rotating shaft disposed in the hollow portion. The heat-dissipation device comprises a wind-guiding cover and at least a first fan. The wind-guiding cover is sleeved on the motor from the bottom of the motor. The wind-guiding cover comprises a wind-guiding main board and a plurality of wind-guiding lateral boards. The wind-guiding main board is disposed adjacent to the second surface. The wind-guiding lateral boards are vertically extended from different lateral edges of the wind-guiding main board towards the same direction, respectively. Each wind-guiding lateral board is disposed corresponding to one of the heatsinks, and at least one of the wind-guiding lateral boards has at least a hole. The number of first fans is equal to the number of holes, and the first fans are one-to-one received by corresponding holes.

In accordance with another aspect of the present invention, there is provided a motor. The motor comprises a stator, a rotor and a heat-dissipation device. The stator has a hollow portion, a coil portion and a housing portion. The housing portion has a first surface, a second surface, a plurality of sidewalls and a plurality of hollowed-out areas. The first surface and the second surface are the front surface and the rear surface of the stator. The hollow portion is penetrated through the housing portion and disposed at the center of the housing portion. The coil portion is disposed around the hollow portion and between the hollow portion and the housing portion, and directly contacted with the housing portion. The hollowed-out areas are respectively formed at the corner of the first surface and the second surface adjacent to two adjacent sidewalls of the sidewalls, and the hollowed-out areas have a plurality of hollowed-out penetration holes penetrated through the first surface and the second surface. The rotor comprises a rotating shaft disposed in the hollow portion. The heat-dissipation device comprises a wind-guiding cover and a plurality of main fans. The wind-guiding cover is sleeved on the motor from the bottom of the motor. The wind-guiding cover comprises a wind-guiding main board and a plurality of wind-guiding lateral boards. The wind-guiding main board is disposed adjacent to the second surface. The wind-guiding main board has a plurality of openings. The openings are respectively corresponded to the hollowed-out areas. The wind-guiding lateral boards are vertically extended from different lateral edges of the wind-guiding main board towards the same direction, respectively. The number of main fans is equal to the number of openings, and the main fans are one-to-one received by the openings.

In accordance with another aspect of the present invention, there is provided a heat-dissipation device of a motor having a stator. The stator has a plurality of hollowed-out areas. The heat-dissipation device comprises a wind-guiding cover and a plurality of main fans. The wind-guiding cover comprises a wind-guiding main board and a plurality of wind-guiding lateral boards. The wind-guiding main board has a plurality of openings. The openings are respectively corresponded to the hollowed-out areas. The wind-guiding lateral boards are vertically extended from different lateral edges of the wind-guiding main board towards the same direction, respectively. The number of main fans is equal to the number of openings, and the main fans are one-to-one received by the corresponding openings.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
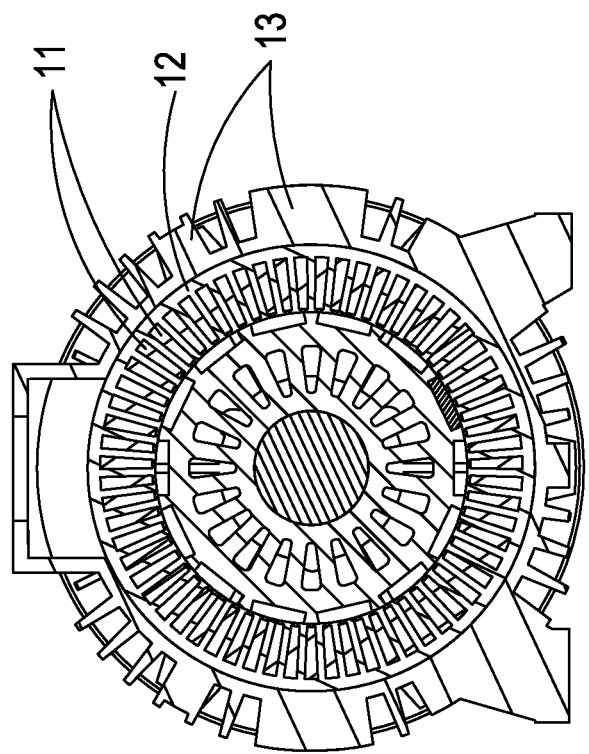
FIG. 1 schematically illustrates a sectional view of a conventional motor.
Figure 2:
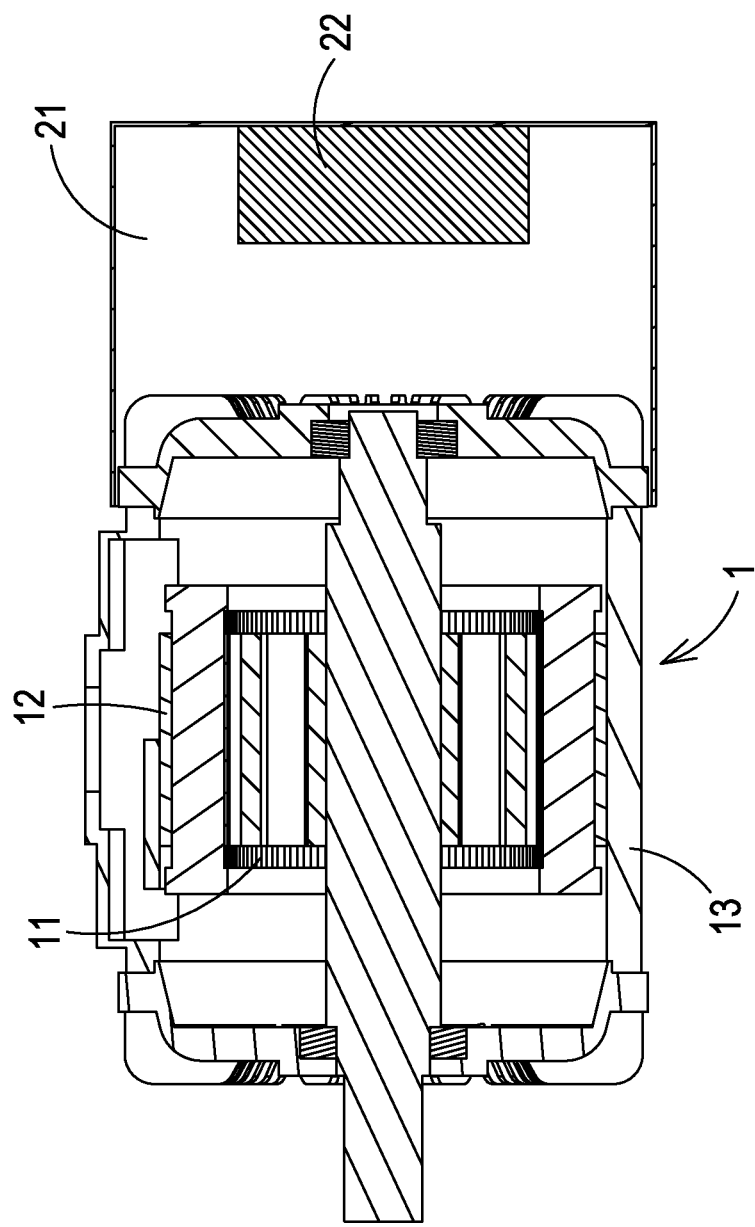
FIG. 2 schematically illustrates another sectional view of a conventional motor.
Figure 3:
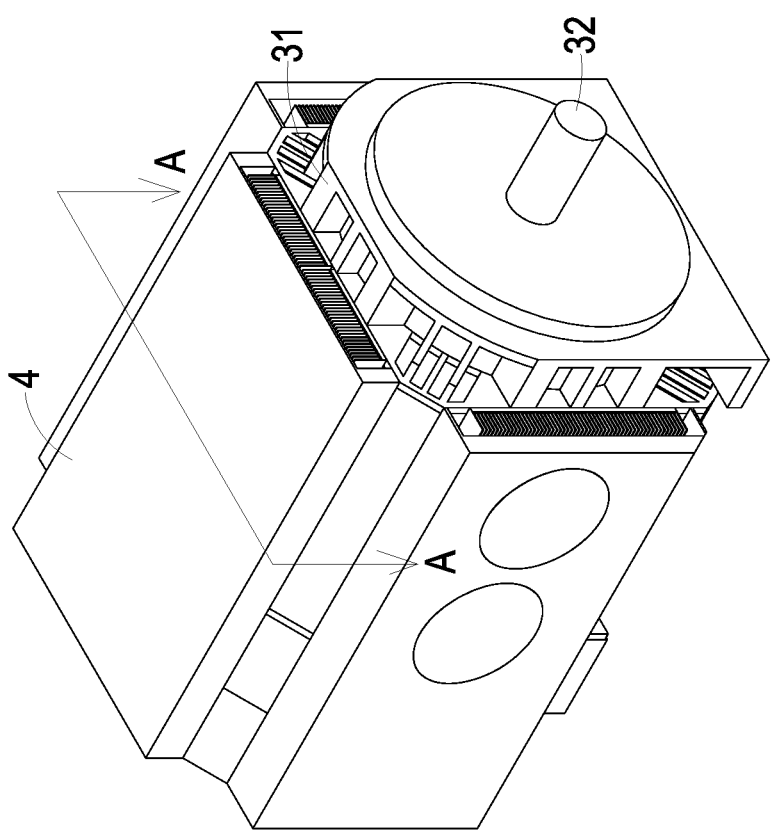
FIG. 3 schematically illustrates the structure of a motor according to an embodiment of the present invention.
Figure 4:
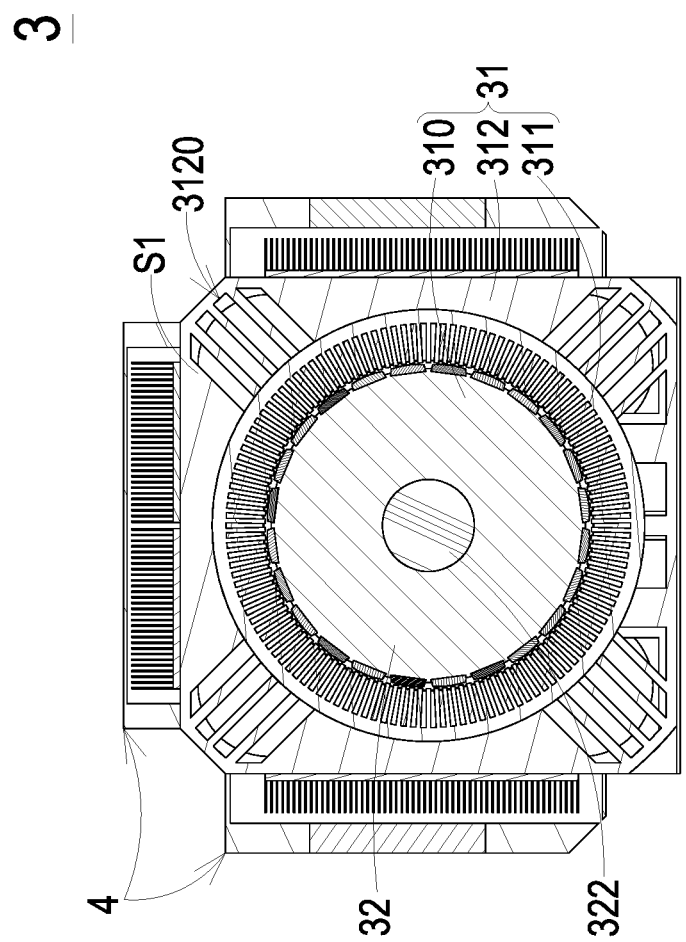
FIG. 4 schematically illustrates the sectional view taken along line A-A shown in FIG. 3.
Figure 5:
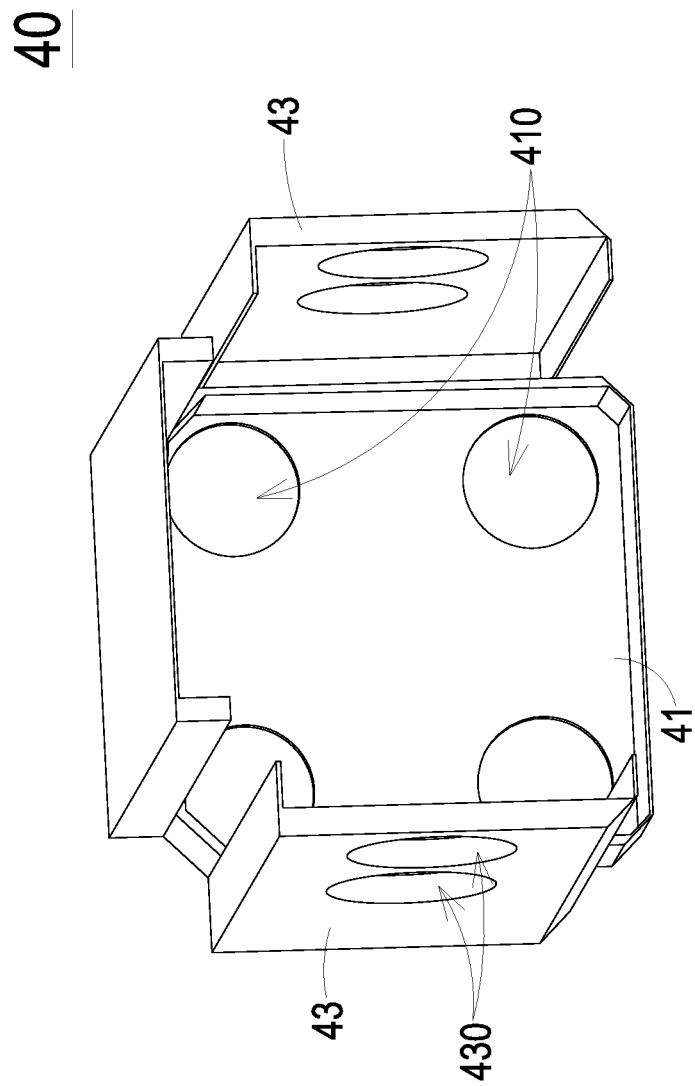
FIG. 5 schematically illustrates the structure of a wind-guiding cover according to an embodiment of the present invention.
Figure 6B:
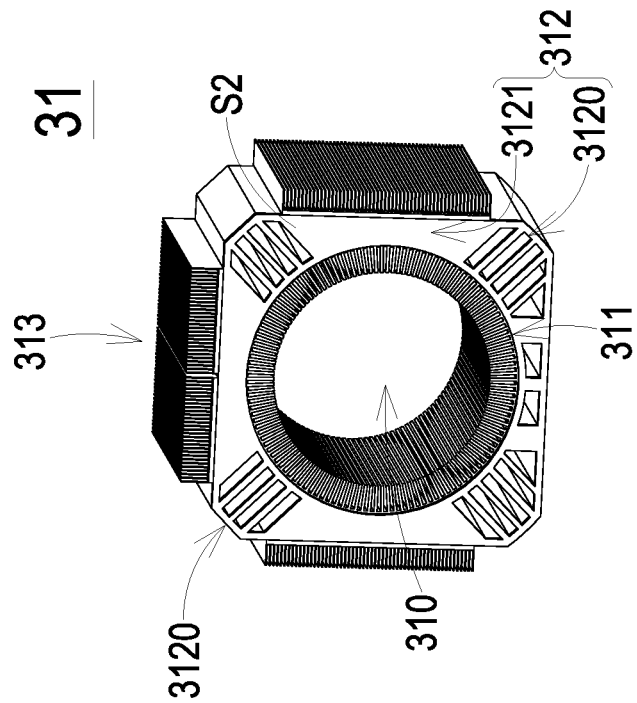
FIG. 6B schematically illustrates the structural view of the rear of the stator of the motor of the present invention.
Figure 6A:
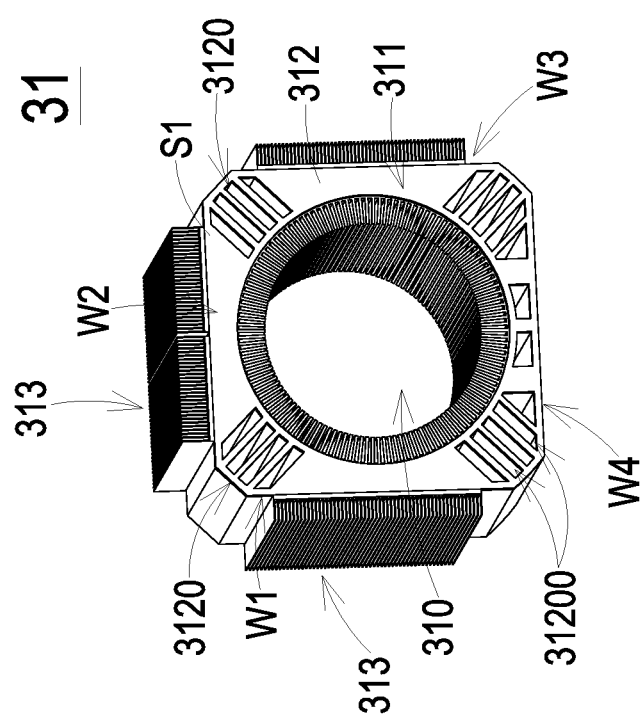
FIG. 6A schematically illustrates the structural view of the front of the stator of the motor of the present invention.
Figure 7:
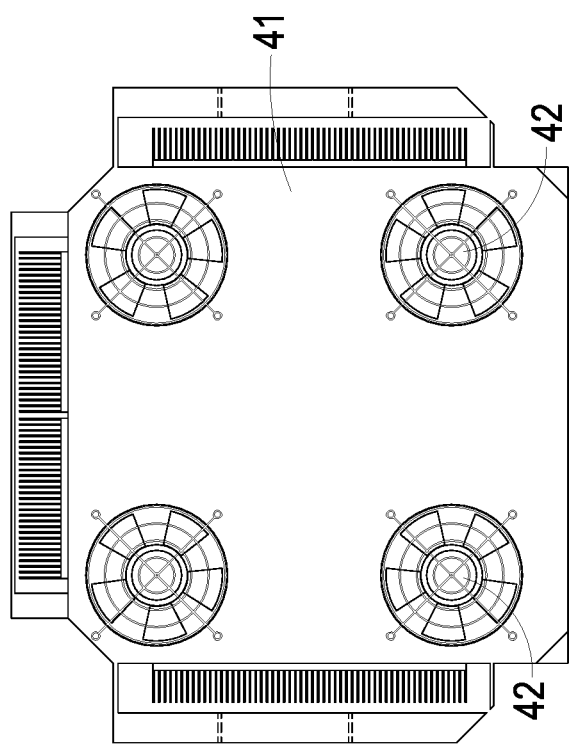
FIG. 7 schematically illustrates the rear view of the motor shown in FIG. 3.

Please refer to FIG. 3, FIG. 4, FIG. 5, FIG. 6A, FIG. 6B and FIG. 7. FIG. 3 schematically illustrates the structure of a motor according to an embodiment of the present invention. FIG. 4 schematically illustrates the sectional view taken along line A-A shown in FIG. 3. FIG. 5 schematically illustrates the structure of a wind-guiding cover according to an embodiment of the present invention. FIG. 6A schematically illustrates the structural view of the front of the stator of the motor of the present invention. FIG. 6B schematically illustrates the structural view of the rear of the stator of the motor of the present invention. FIG. 7 schematically illustrates the rear view of the motor shown in FIG. 3. As shown in FIG. 3, FIG. 4, FIG. 5, FIG. 6A, FIG. 6B and FIG. 7, a motor 3 of an embodiment of the present invention comprises a stator 31, a rotor 32 and a heat-dissipation device 4.

The rotor 32 has a rotating shaft 322. The stator 31 has a hollow portion 310, a coil portion 311 and a housing portion 312. The housing portion 312 can be made of silicon steel. The housing portion 312 has a first surface S1, a second surface S2, a solid area 3121 and a plurality of hollowed-out areas 3120. The first surface S1 and the second surface S2 are respectively the front surface and the rear surface of the stator 31, and are parallel to each other. The number of the hollowed-out areas 3120 can be four in this embodiment. The four hollowed-out areas 3120 are respectively located at four corners of the housing portion 312. The hollow portion 310 is penetrated through the housing portion 312 of the stator 31 and located at the center of the housing portion 312. The rotor 32 can be disposed in the hollow portion 310. The coil portion 311 is disposed around the housing portion 312 (e.g. the inner side or the inner rim of the housing portion 312), disposed between the hollow portion 310 and the housing portion 312, and directly contacted with the housing portion 312. Therefore, the thermal conduction can be directly implemented.

Please refer to FIG. 4, FIG. 6A and FIG. 6B again. In some embodiments, the stator 31 of the motor 3 of the present invention has a first sidewall W1, a second sidewall W2, a third sidewall W3 and a fourth sidewall W4. The first sidewall W1, the second sidewall W2, the third sidewall W3 and the fourth sidewall W4 are each perpendicular to the first surface S1 and the second surface S2. The first sidewall W1 is parallel to the third sidewall W3, and the second sidewall W2 is parallel to the fourth sidewall W4.

In some embodiments, the stator 31 can further comprise a plurality of heatsinks 313. Considering there is a need to utilize one sidewall of the housing portion 312 as the surface the motor 3 being placed, the heatsinks 313 are only disposed on the rest three sidewalls of the first sidewall W1, the second sidewall W2, the third sidewall W3 and the fourth sidewall W4. In other words, three heatsinks 313 are disposed on three of the first sidewall W1, the second sidewall W2, the third sidewall W3 and the fourth sidewall W4, so that the efficiency of the thermal conduction from the coil portion 311 to the heatsinks 313 through the housing portion 312 is enhanced.

In some embodiments, the heat-dissipation device 4 comprises a wind-guiding cover 40, a plurality of lateral fans (hereinafter "first fan(s) 44") and at least a main fan (hereinafter "second fan 42"). The first fans 44 are correspondingly disposed on the heatsinks 313. At least one of the first fans 44 is disposed on each heatsink 313. In this embodiment, two first fans 44 are disposed on each heatsink 313. The second fan 42 is disposed on the second surface S2 of the housing portion 312. In this embodiment, each second fan 42 is disposed on one of the four hollowed-out areas 3120 located at four corners of the second surface S2 of the housing portion 312. In other words, four second fans 42 are respectively disposed at the four corners of the second surface S2, so that the airflow generated by each second fan 42 can be flew through the corresponded hollowed-out area 3120. In some embodiments, the four fans 42 mentioned above can be replaced by a single fan with a bigger size. The single fan with the bigger size is disposed on almost entire the second surface S2.

In this embodiment, the wind-guiding cover 40 comprises a wind-guiding main board 41 and three wind-guiding lateral boards 43 vertically extended from three lateral edges of the wind-guiding main board 41. The wind-guiding cover 40 is sleeved on the motor 3 from the bottom of the motor 3 (i.e. the second surface S2 of the housing portion 312). The wind-guiding main board 41 is disposed adjacent to the second surface S2. The wind-guiding main board 41 has a plurality of openings 410. The positions of the openings 410 are respectively corresponded to the second fans 42 and the hollowed-out areas 3120. The number of second fans 42 is equal to the number of openings 410, and the second fans 42 are one-to-one received by the openings 410.

Figure 8:
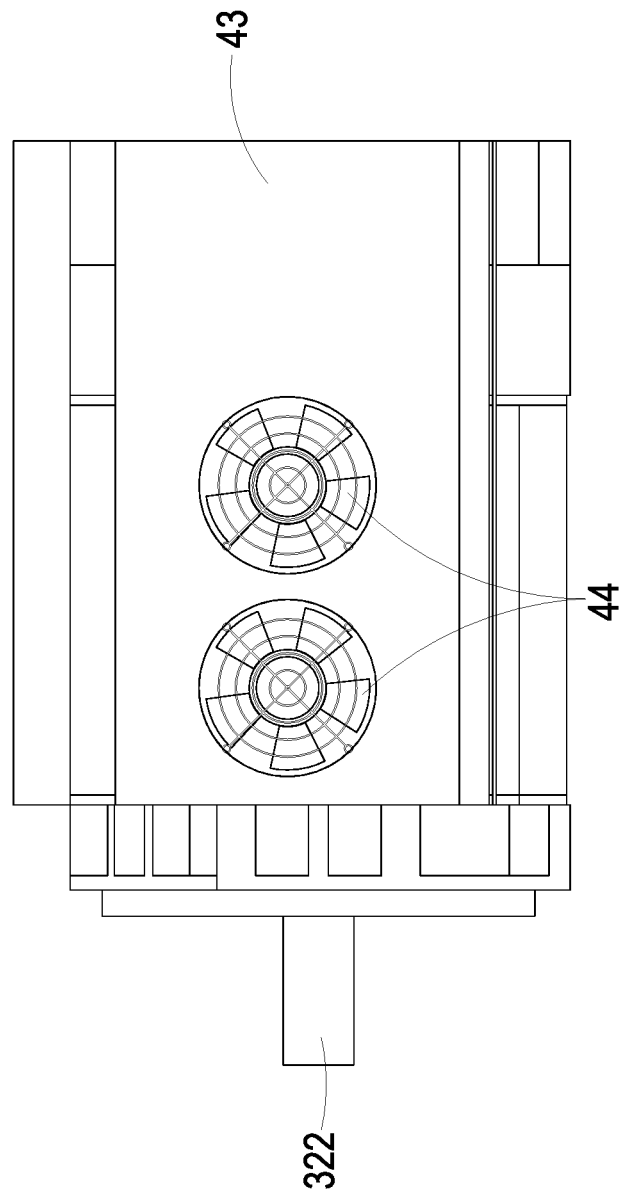
FIG. 8 schematically illustrates the lateral view of the motor shown in FIG. 3 after the lateral fans are installed.

Please refer to FIG. 5, FIG. 6A and FIG. 8. FIG. 8 schematically illustrates the lateral view of the motor shown in FIG. 3 after the lateral fans are installed. Each of the wind-guiding lateral boards 43 of the wind-guiding cover 40 is disposed corresponding to one of the heatsinks 313. In this embodiment, two wind-guiding lateral boards 43 that are opposite to each other, of the three wind-guiding lateral boards 43, have at least a hole 430. The number of holes 430 is equal to the number of first fans 44, and each first fan 44 on the heatsink 313 is one-to-one received by a corresponding hole 430 of the wind-guiding lateral boards 43. Preferably, the first fan 44 and the second fan 42 are axial fans, but not limited herein.

It should be noted that in the present invention, the core features are to provide a motor with the motor housing and the stator stamped and formed together (e.g. one-pieced formed), in which the motor is also called a housing-less motor. Since the motor is one-pieced formed to have the one-pieced formed structure, the material cost can be significantly reduced. In addition, the stator 31 and the heatsinks 313 can also be a one-piece formed structure made of silicon steel. Certainly, the heatsinks 313 can be added externally (e.g. aluminum extruded heatsinks). Each heatsink 313 comprises a plurality of heat-dissipation fins. Thermal grease is coated on the interface (i.e. contact surface) of the heatsink 313 and the stator 31 to reduce the contact heat resistance. Since the stator 31 itself is still a one-piece formed structure, even though the efficiency of thermal conduction is not as good as the motor mentioned above which is completely a one-piece formed motor, this motor substantially surpasses the conventional motor of prior art. Not only the entire heat-dissipation area is increased but also the utilization and efficiency of the fan is effectively enhanced and the better heat-dissipation ability is achieved.

Please refer to FIG. 6A and FIG. 6B again. In some embodiments, the hollowed-out areas 3120 of the housing portion 312 of the stator 31 are preferred to be respectively formed at the corner of the first surface S1 and the second surface S2 adjacent to the first sidewall W1 and the second sidewall W2, the corner of the first surface S1 and the second surface S2 adjacent to the second sidewall W2 and the third sidewall W3, the corner of the first surface S1 and the second surface S2 adjacent to the third sidewall W3 and the fourth sidewall W4 and the corner of the first surface S1 and the second surface S2 adjacent to the fourth sidewall W4 and the first sidewall W1. The hollowed-out areas 3120 are corresponded to the second fan 42 and the opening 410 of the wind-guiding main board 41. Furthermore, the hollowed-out areas 3120 have a plurality of hollowed-out penetration holes 31200, and each hollowed-out penetration hole 31200 is penetrated through the first surface S1 and the second surface S2. Therefore, a complete airflow path is formed. The airflow is driven by the second fan 42 to flow through the four corners of the housing portion 312 of the stator 31 and along the extension direction of the rotating shaft 322 and escape from each hollowed-out penetration hole 31200 of the hollowed-out areas 3120, so that the heat generated by the coil portion 311 can be effectively removed from system. As a result, the efficiency of thermal conduction is effectively enhanced.

On the other hand, it can be seen from FIG. 4 and FIG. 8 that the airflow path of the first fan 44 is from the heat-dissipation device 4 towards the heatsink 313, along the heatsink 313 and the first sidewall W1, the second sidewall W2, the third sidewall W3 or the fourth sidewall W4 that the heatsink 313 is disposed on, to the laterally outside. This airflow path of the first fan 44 and the airflow path passed through the hollowed-out areas are independent and isolated with each other. The interferences will not happen. The energy loss caused by the interaction of the airflow paths can be avoided.

Figure 9:
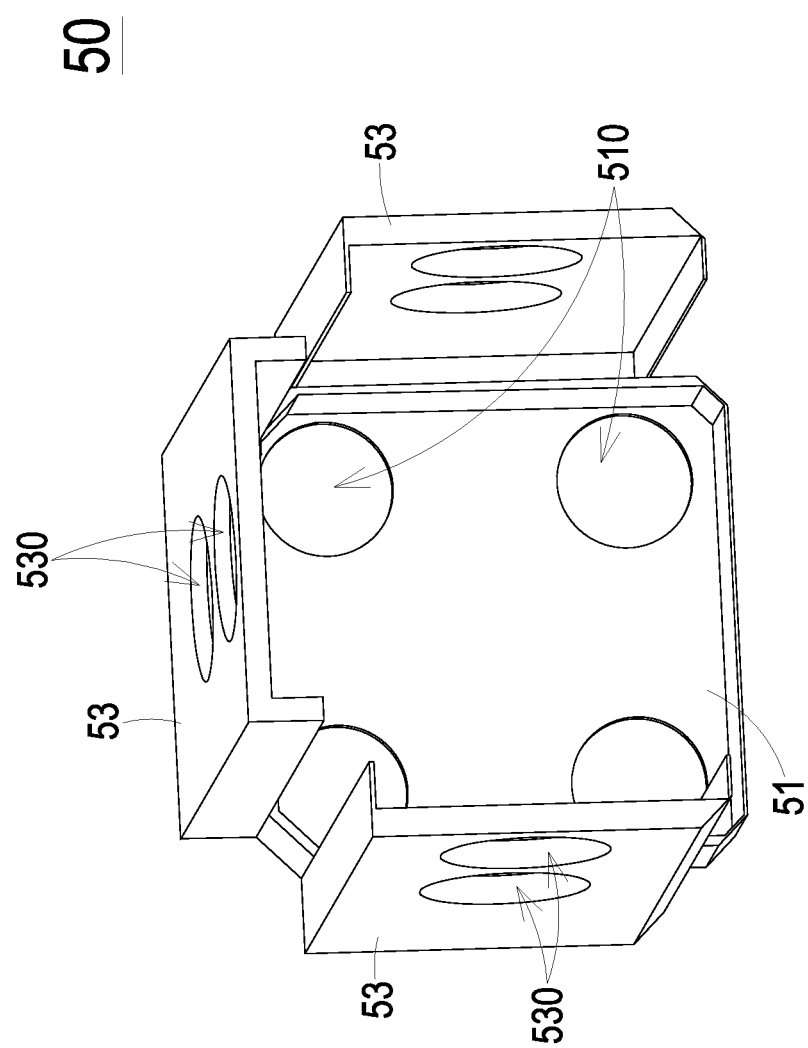
FIG. 9 schematically illustrates the structure of a wind-guiding cover according to another embodiment of the present invention.
Figure 10:
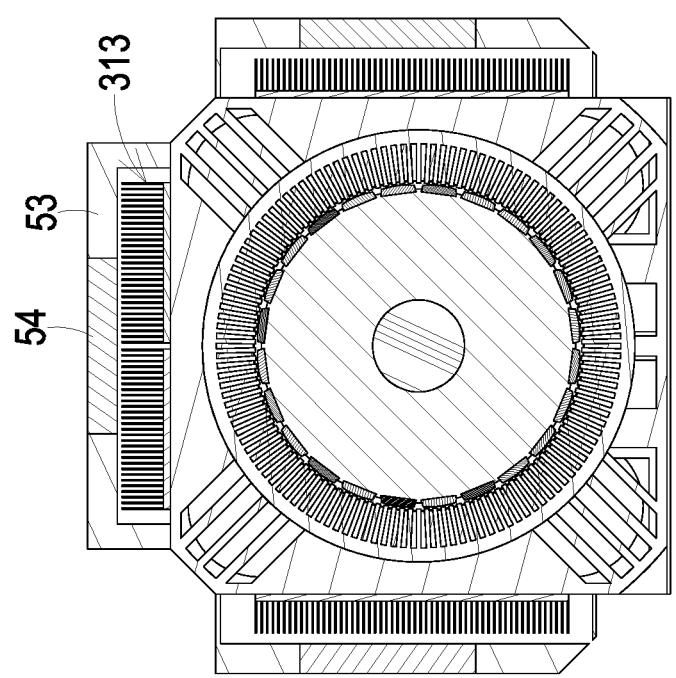
FIG. 10 schematically illustrates the motor shown in FIG. 4 utilizing the wind-guiding cover shown in FIG. 9 in replace of the wind-guiding cover shown in FIG. 4.

Please refer to FIG. 9 and FIG. 10. FIG. 9 schematically illustrates the structure of a wind-guiding cover according to another embodiment of the present invention. FIG. 10 schematically illustrates the motor shown in FIG. 4 utilizing the wind-guiding cover shown in FIG. 9 in replace of the wind-guiding cover shown in FIG. 4. As shown in FIG. 9 and FIG. 10, a wind-guiding cover 50 of another embodiment of the present invention comprises a wind-guiding main board 51 and a plurality of wind-guiding lateral boards 53. The wind-guiding main board 51 and the wind-guiding lateral boards 53 are similar with the wind-guiding main board 41 and the wind-guiding lateral boards 43 and also having a plurality of openings 510, so it is not redundantly described herein. In this embodiment, the number of the wind-guiding lateral boards 53 is preferably three. The three wind-guiding lateral boards 53 are respectively disposed corresponding to the first sidewall W1, the second sidewall W2 and the third sidewall W3 of the stator 31. Each wind-guiding lateral board 53 has two holes 530. Moreover, each of the first fan 54 is received by one of the holes 530, so that the heat-dissipation of the stator 31 is implemented. As to the fourth sidewall W4, the fourth sidewall W4 is mainly applied to be disposed on a plane, so none of the wind-guiding lateral board is disposed on the fourth sidewall W4. Under this circumstance, the motor of the present invention can be applied to different products, and the product volume can be effectively reduced.

From the above description, the present invention provides a motor and a heat-dissipation device thereof. Through the design of a motor without any extra housing, the heat generated by the coil can be directly conducted to the stator and be removed from the hollowed-out areas. Not only the contact heat resistance that is usually existed in the conventional motor is not existed but also the heat transfer efficiency is enhanced and the material cost is reduced. Meanwhile, by applying the heat-dissipation device, the main fan disposed on the wind-guiding main board can directly implement the heat-dissipation on the hollowed-out areas, and the lateral fans disposed on the wind-guiding lateral boards can directly implement the heat-dissipation on the sidewalls of the stator. Moreover, since the airflow paths of the main fan and the lateral fans are independent and isolated to each other, the energy loss caused by the interaction of the airflow paths can be avoided, so that the utilization of fans are increased, and the total heat-dissipating area of the motor is also increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor, comprising:
    a stator having a hollow portion, a coil portion and a housing portion, wherein the housing portion has a first surface, a second surface and a plurality of sidewalls, the first surface and the second surface are the front surface and the rear surface of the stator, the hollow portion is penetrated through the housing portion and disposed at the center of the housing portion, the coil portion is disposed around the hollow portion and between the hollow portion and the housing portion, and directly contacted with the housing portion;
    a plurality of heatsinks respectively disposed on different sidewalls of the housing portion;
    a rotor comprising a rotating shaft, wherein the rotor is disposed in the hollow portion; and
    a heat-dissipation device comprising:
        a wind-guiding cover sleeved on the motor from the bottom of the motor, comprising:
            a wind-guiding main board disposed adjacent to the second surface; and
            a plurality of wind-guiding lateral boards vertically extended from different lateral edges of the wind-guiding main board towards the same direction, respectively, wherein each wind-guiding lateral board is disposed corresponding to one of the heatsinks, and at least one of the wind-guiding lateral boards has a plurality of holes; and
        a plurality of first fans, wherein the number of first fans is equal to the number of holes, and each of the first fans is one-to-one received by a corresponding hole of the wind-guiding lateral board, which is perpendicular to the wind-guiding main board.

2. The motor according to claim 1, wherein the sidewalls comprise a first sidewall, a second sidewall, a third sidewall and a fourth sidewall, the first sidewall, the second sidewall, the third sidewall and the fourth sidewall are perpendicular to the first surface and the second surface, the first sidewall is parallel to the third sidewall, and the second sidewall is parallel to the fourth sidewall.

3. The motor according to claim 2, wherein the heatsinks are respectively disposed on the first sidewall and the third sidewall.

4. The motor according to claim 2, wherein the heatsinks are respectively disposed on three of the first sidewall, the second sidewall, the third sidewall and the fourth sidewall.

5. The motor according to claim 2, wherein the housing portion further has a solid area and a plurality of hollowed-out areas, the hollowed-out areas are respectively formed at the corner of the first surface and the second surface adjacent to the first sidewall and the second sidewall, the corner of the first surface and the second surface adjacent to the second sidewall and the third sidewall, the corner of the first surface and the second surface adjacent to the third sidewall and the fourth sidewall and the corner of the first surface and the second surface adjacent to the fourth sidewall and the first sidewall, the hollowed-out areas have a plurality of hollowed-out penetration holes, and each hollowed-out penetration hole is penetrated through the first surface and the second surface.

6. The motor according to claim 5, wherein the wind-guiding main board has at least an opening.

7. The motor according to claim 6 further comprising a second fan disposed on the second surface, wherein the second fan is one-to-one received by the opening.

8. The motor according to claim 7, wherein the first fan and the second fan are axial fans.

9. The motor according to claim 6 further comprising a plurality of second fans disposed on the second surface, wherein the number of second fans is equal to the number of openings, the second fans are one-to-one received by the opening, and the positions of the second fans correspond to the hollowed-out areas.

10. The motor according to claim 8, wherein the first fan and the second fans are axial fans.

11. The motor according to claim 1, wherein the heatsinks comprise a plurality of heat-dissipation fins.

12. The motor according to claim 1, wherein the stator and the heatsinks are a one-piece formed structure made of silicon steel.

13. A motor, comprising:
    a stator having a hollow portion, a coil portion and a housing portion, wherein the housing portion has a first surface, a second surface, a plurality of sidewalls and a plurality of hollowed-out areas, the first surface and the second surface are the front surface and the rear surface of the stator, the hollow portion is penetrated through the housing portion and disposed at the center of the housing portion, the coil portion is disposed around the hollow portion and between the hollow portion and the housing portion, the coil portion is directly contacted with the housing portion, the hollowed-out areas are respectively formed at the corner of the first surface and the second surface adjacent to two adjacent sidewalls of the sidewalls, and the hollowed-out areas have a plurality of hollowed-out penetration holes penetrated through the first surface and the second surface;
    a rotor comprising a rotating shaft, wherein the rotor is disposed in the hollow portion; and
    a heat-dissipation device comprising:
        a wind-guiding cover sleeved on the motor from the bottom of the motor, comprising:
            a wind-guiding main board disposed adjacent to the second surface, wherein the wind-guiding main board has a plurality of openings, and the openings are respectively corresponded to the hollowed-out areas; and
            a plurality of wind-guiding lateral boards vertically extended from different lateral edges of the wind-guiding main board towards the same direction, respectively; and
        a plurality of main fans, wherein the number of main fans is equal to the number of openings, wherein the main fans are one-to-one received by the openings of the wind-guiding main board, which is perpendicular to the wind-guiding lateral boards.

14. A heat-dissipation device of a motor having a stator, the stator having a plurality of hollowed-out areas, the heat-dissipation device comprises:
- a wind-guiding cover comprising a wind-guiding main board and a plurality of wind-guiding lateral boards, wherein the wind-guiding main board has a plurality of openings, the openings are respectively corresponded to the hollowed-out areas, and the wind-guiding lateral boards are vertically extended from different lateral edges of the wind-guiding main board towards the same direction, respectively; and
- a plurality of main fans, wherein the number of main fans is equal to the number of openings, and the main fans are one-to-one received by openings of the wind-guiding main board, which is perpendicular to the wind-guiding lateral boards.

15. The heat-dissipation device according to claim 14 further comprising at least a lateral fan, wherein the wind-guiding lateral board has at least a hole, the number of lateral fans is equal to the number of holes, and each lateral fan is one-to-one received by a corresponding hole.

\* \* \* \* \*